(12) United States Patent
Kawai

(10) Patent No.: US 10,984,538 B2
(45) Date of Patent: *Apr. 20, 2021

(54) IMAGE-PROCESSING DEVICE, IMAGE-PROCESSING METHOD, AND RECORDING MEDIUM

(71) Applicant: NEC CORPORATION, Tokyo (JP)

(72) Inventor: Ryo Kawai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 154 days.

This patent is subject to a terminal disclaimer.

(21) Appl. No.: 16/082,624

(22) PCT Filed: Feb. 27, 2017

(86) PCT No.: PCT/JP2017/007374
§ 371 (c)(1),
(2) Date: Sep. 6, 2018

(87) PCT Pub. No.: WO2017/154630
PCT Pub. Date: Sep. 14, 2017

(65) Prior Publication Data
US 2019/0026906 A1   Jan. 24, 2019

(30) Foreign Application Priority Data

Mar. 9, 2016   (JP) .............................. JP2016-045821

(51) Int. Cl.
*G06T 7/246* (2017.01)
*G06K 9/62* (2006.01)
(Continued)

(52) U.S. Cl.
CPC .......... *G06T 7/248* (2017.01); *G06K 9/00369* (2013.01); *G06K 9/00771* (2013.01);
(Continued)

(58) Field of Classification Search
CPC ..................... G06T 7/248; G06T 5/002; G06T 2207/20081; G06T 2207/20201;
(Continued)

(56) References Cited

U.S. PATENT DOCUMENTS

2004/0062450 A1* 4/2004 Kondo ..................... G06T 7/194
382/266
2010/0202711 A1* 8/2010 Kondo ...................... G06T 1/20
382/254
2015/0086119 A1* 3/2015 Sato ................... G06K 9/00234
382/195

FOREIGN PATENT DOCUMENTS

JP        05-303645 A     11/1993
JP        2002-190012 A    7/2002
(Continued)

OTHER PUBLICATIONS

Masamitsu Tsuchiya et al., "Efficient Learning Method for Human Detection based on Automatic Generation of Training Samples with the Negative-Bag MILBoost", The Institute of Electrical Engineers of Japan (IEEJ) Transactions on Electronics, Information and Systems, Jan. 2014, pp. 450-458, vol. 134, No. 3.
(Continued)

*Primary Examiner* — Margaret G Mastrodonato
(74) *Attorney, Agent, or Firm* — Sughrue Mion, PLLC

(57) ABSTRACT

In order to produce a discriminator that has higher discrimination ability, this image-processing device is provided with a synthesis unit for synthesizing a background image and an object image the hue and/or brightness of which at least partially resembles at least a portion of the background image, a generation unit for generating a difference image between the synthesized image and the background image, and a machine learning unit for performing machine learning using the generated difference image as learning data.

8 Claims, 13 Drawing Sheets

(51) Int. Cl.
  *G06K 9/00* (2006.01)
  *G06T 7/254* (2017.01)
  *G06T 7/90* (2017.01)
  *G06N 3/08* (2006.01)
  *G06T 5/00* (2006.01)

(52) U.S. Cl.
  CPC .............. *G06K 9/6256* (2013.01); *G06N 3/08* (2013.01); *G06T 5/002* (2013.01); *G06T 7/251* (2017.01); *G06T 7/254* (2017.01); *G06T 7/90* (2017.01); *G06T 2207/20081* (2013.01); *G06T 2207/20201* (2013.01)

(58) Field of Classification Search
  CPC ........... G06T 7/251; G06T 7/254; G06T 7/90; G06K 9/6256; G06K 9/00369; G06K 9/00771; G06N 3/08
  USPC ......................................................... 382/264
  See application file for complete search history.

(56) References Cited

FOREIGN PATENT DOCUMENTS

| | | |
|---|---|---|
| JP | 3612220 B2 | 1/2005 |
| JP | 2014-178957 A | 9/2014 |
| JP | 2015-019133 A | 1/2015 |
| JP | 2015-060495 A | 3/2015 |
| WO | 2015/064292 A1 | 5/2015 |

OTHER PUBLICATIONS

Written Opinion for PCT/JP2017/007374, dated May 23, 2017.
International Search Report for PCT/JP2017/007374, dated May 23, 2017.
Japanese Office Action for JP Application No. 2018-504377 dated Mar. 9, 2021 with English Translation.

* cited by examiner

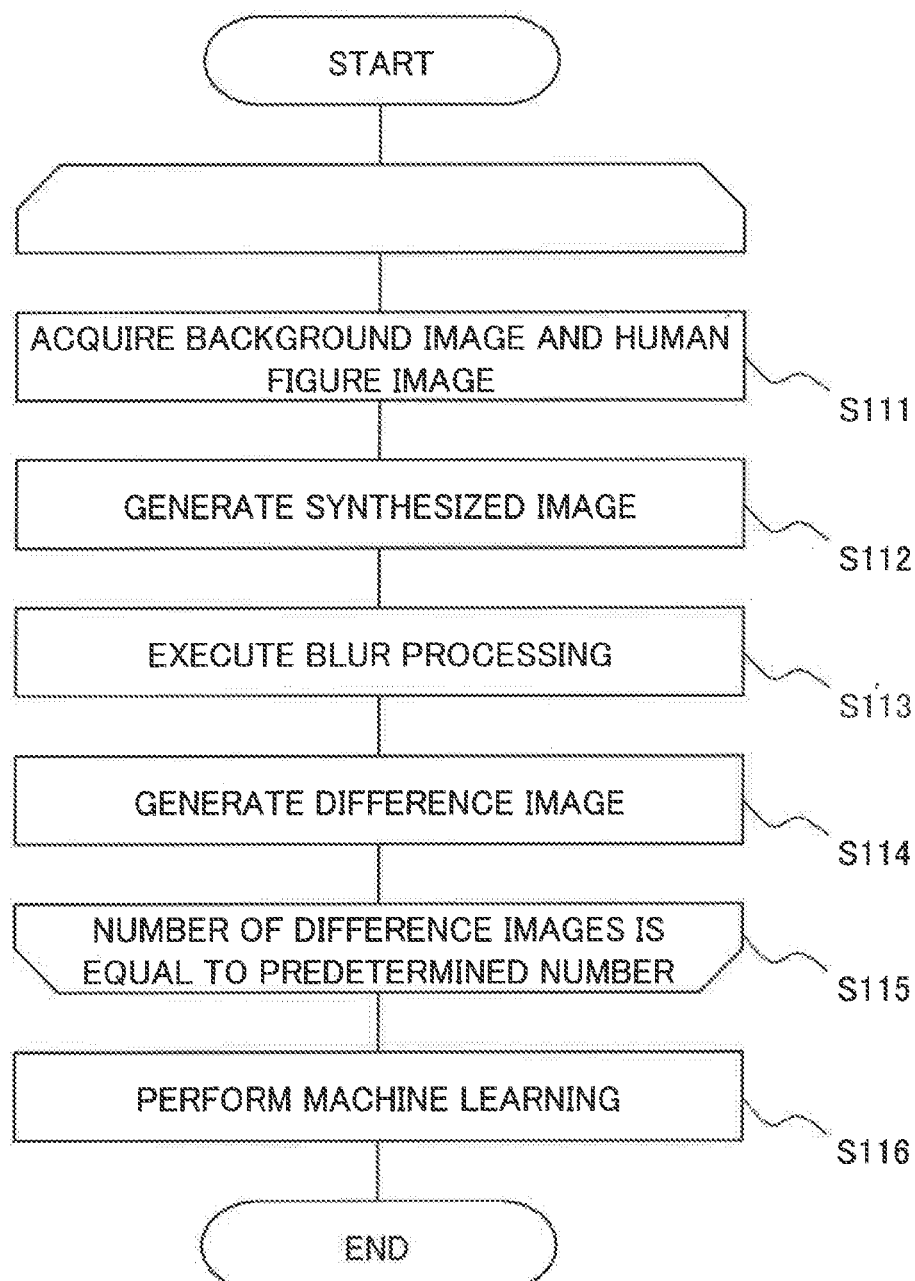

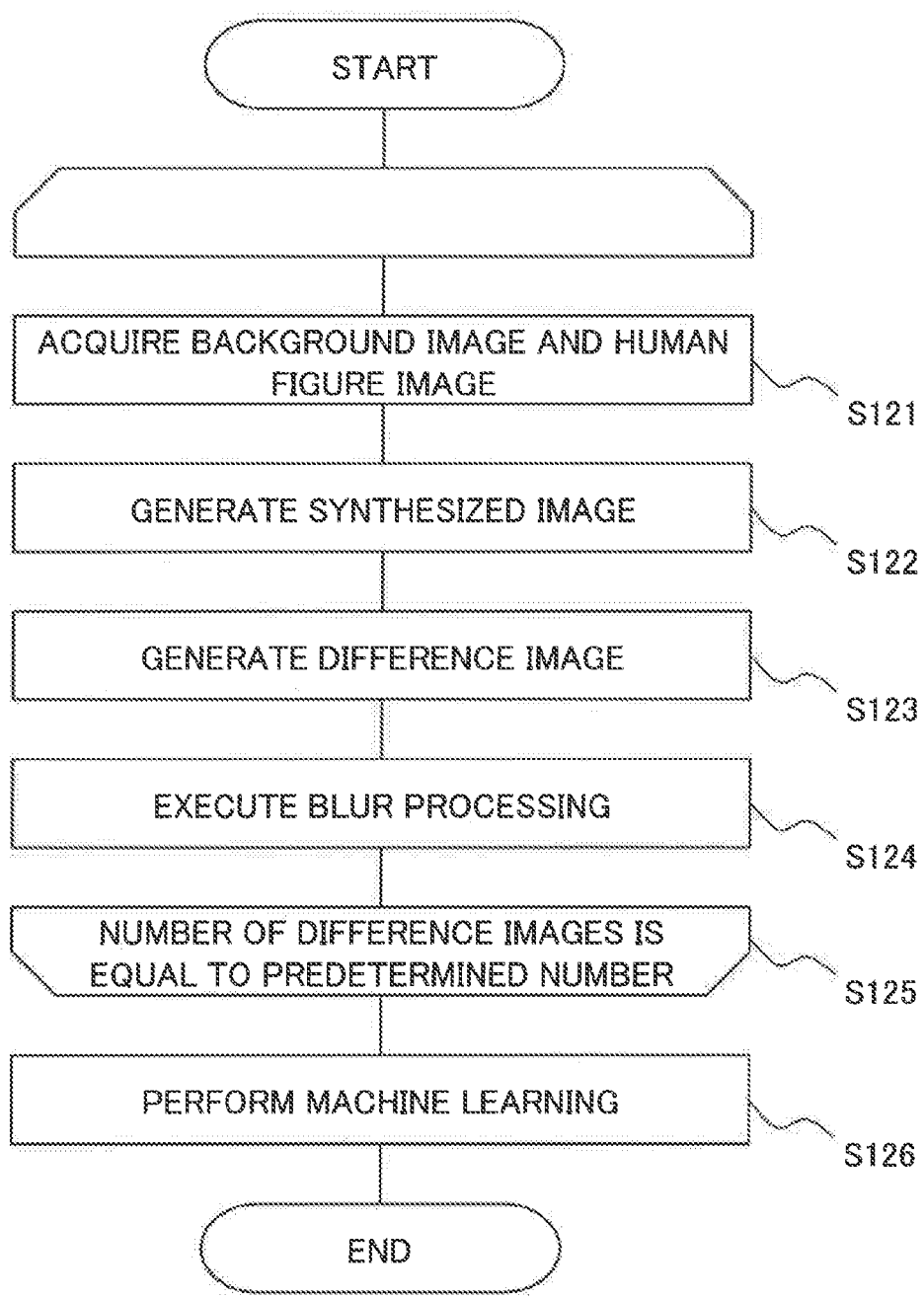

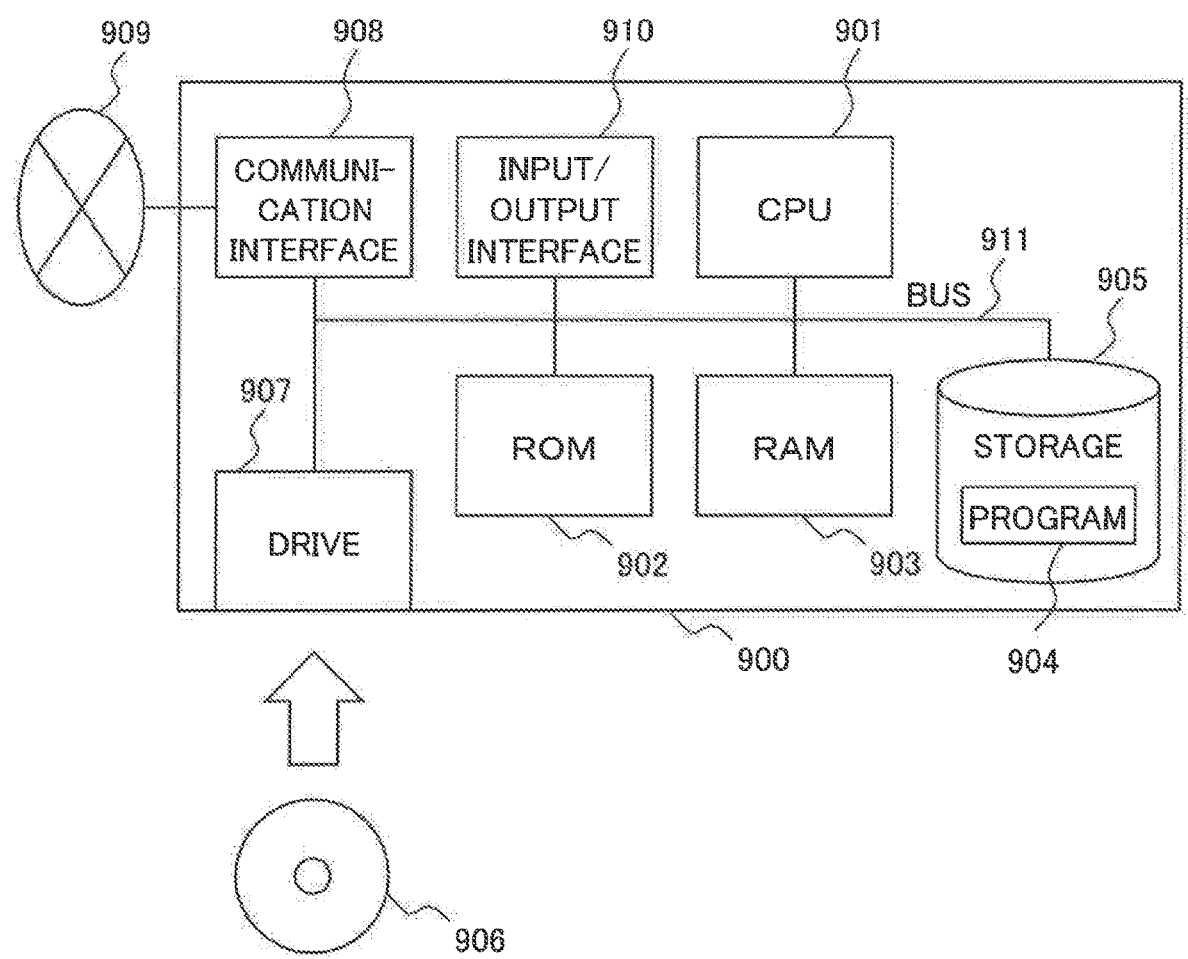

IMAGE-PROCESSING DEVICE, IMAGE-PROCESSING METHOD, AND RECORDING MEDIUM

CROSS REFERENCE TO RELATED APPLICATIONS

This Application is a National Stage of International Application No. PCT/JP2017/007374 filed Feb. 27, 2017, claiming priority based on Japanese Patent Application No. 2016-045821 filed Mar. 9, 2016, the contents of all of which are incorporated herein by reference.

TECHNICAL FIELD

The present disclosure relates to an image-processing device configured to perform machine learning, an image-processing method, and a recording medium.

BACKGROUND ART

Images captured by image-capturing devices such as surveillance cameras can be used for various purposes in such areas as crime prevention and investigation as well as marketing. In these areas, systems for automatic analysis by a computer have been developed, wherein the detection of a designated object, among others, is indispensable for a sophisticated analysis.

As a method to be used for detecting a designated object, a method has been proposed in which the difference between a background image and an image in a different frame is calculated and the part with a large difference is detected (PTL 1). Parameters such as threshold values for judging the magnitude of the difference are changed to fit the environment including the lighting conditions. There has been proposed a method of setting such parameters by means of a synthesized image obtained by synthesizing a background image and a virtual object image (PTL 2).

Such a difference may also be present due to a movement of an object which is not targeted (an object which is not the target of the detection). There has been proposed a method using machine learning for determining whether or not an object for which a difference has been calculated (a detected object) is the target object of the detection (PTL 3).

However, classification of an object by machine learning has a disadvantage in that it requires sufficient learning data to be prepared. As a method for preparing sufficient learning data, there have been proposed methods of generating synthesized images (PTL 4, NPL 1).

CITATION LIST

Patent Literature

[PTL 1] JP 2002-190012 A.
[PTL 2] JP 2015-019133 A.
[PTL 3] JP 3612220 B1.
[PTL 4] JP 1993-303645 A.

Non Patent Literature

[NPL 1] Masamitsu Tsuchiya, Yuji Yamauchi, and Hironobu Fujiyoshi, "Efficient Learning Method for Human Detection based on Automatic Generation of Training Samples with the Negative-Bag MILBoost)", IEEJ Transactions on Electronics, Information and Systems C, The Institute of Electrical Engineers of Japan, Mar. 1, 2014, Vol. 134 No. 3 pp. 450-458.

SUMMARY OF INVENTION

Technical Problem

However, images obtained by synthesis (synthesized image) tend to be too accurate because noise and the like contained in a real environment are not taken into consideration. When such synthesized images are used as learning data, the learning data are different from actually captured images (herein referred to as real data), which deteriorates classification ability.

Some aspects of the present disclosure have been devised to address the above-described problem and an object of the present disclosure is to generate a classifier having a higher classification ability.

Solution to Problem

An aspect of the invention is an image-processing device. The image-processing device includes synthesis means to generate a synthesized image by synthesizing a background image and an object image having at least a portion close in at least one of hue, saturation and brightness to at least a portion of the background image; generation means to generate a difference image between the background image and the synthesized image; and machine learning means to perform machine learning using the difference image as learning data.

Another aspect of the invention is an image-processing method. The image-processing method includes generating a synthesized image by synthesizing a background image and an object image having at least a portion close in at least one of hue, saturation and brightness to at least a portion of the background image; generating a difference image between the background image and the synthesized image; and performing machine learning using the difference image as learning data.

The present disclosure further includes in its scope a computer program that realizes the above-described device or method with a computer and a non-transitory computer-readable recording medium that stores such a computer program.

Advantageous Effects of Invention

According to the present disclosure a classifier having a high classification ability can be generated.

BRIEF DESCRIPTION OF DRAWINGS

FIG. 11 is a flow chart illustrating an example of a sequence of processing by the image-processing device according to the fourth example embodiment.

FIG. 12 is a flow chart illustrating another example of a sequence of processing by the image-processing device according to the fourth example embodiment.

FIG. 13 is a diagram illustrative of a hardware configuration of a computer (information processing device) that enables the implementation of the example embodiments of the present disclosure.

EXAMPLE EMBODIMENT

1. First Example Embodiment

Figure 1:
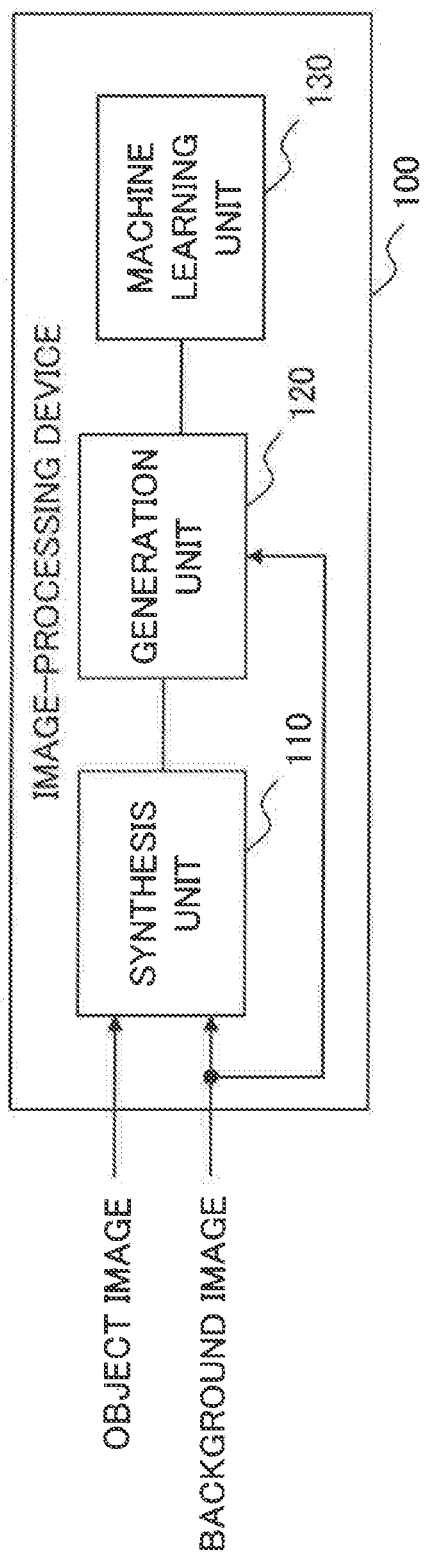
FIG. 1 is a functional block diagram illustrating an example of a functional configuration of an image-processing device according to a first example embodiment.

A first example embodiment of the present disclosure will be described below. FIG. 1 is a functional block diagram illustrating an example of a functional configuration of an image-processing device according to the present example embodiment. As described in FIG. 1, an image-processing device 100 includes a synthesis unit 110, a generation unit 120, and a machine learning unit 130. A background image and an object image are inputted to the synthesis unit 110. The object image is, for example, a human figure image. The object image includes at least a portion close in at least one of hue, saturation and brightness to at least a portion of the background image. The synthesis unit 110 synthesizes the background image and the object image and generates a synthesized image. The synthesis unit 110 then supplies the synthesized image to the generation unit 120.

To the generation unit 120, a background image identical to the background image inputted to the synthesis unit 110 and the synthesized image supplied by the synthesis unit 110 are inputted. The generation unit 120 generates a difference image by calculating the difference between the background image and the synthesized image. The generation unit 120 supplies the difference image so generated to the machine learning unit 130.

The machine learning unit 130 performs machine learning, using the difference image supplied by the generation unit 120 as learning data.

Figure 2:
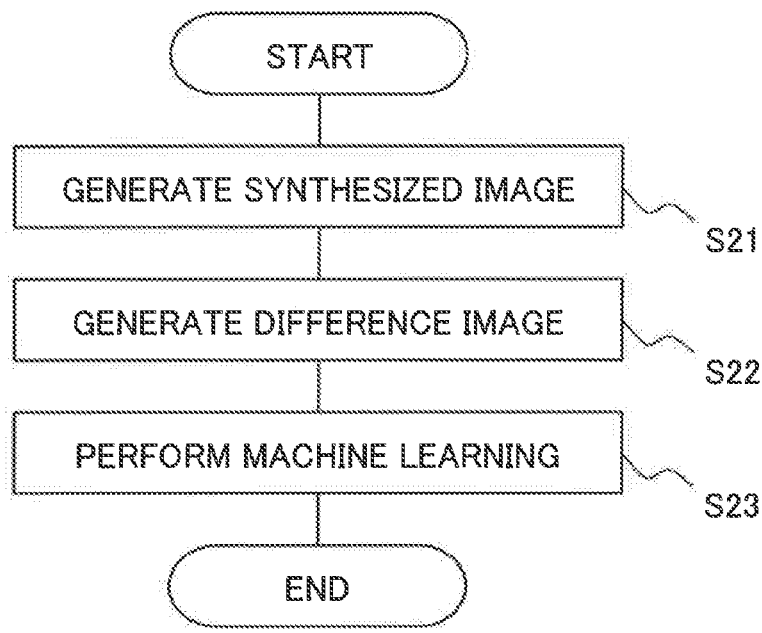
FIG. 2 is a flow chart illustrating an example of a sequence of processing by the image-processing device according to the first example embodiment.

FIG. 2 is a flow chart illustrating an example of a sequence of processing by the image-processing device 100 according to the present example embodiment. As described in FIG. 2, the synthesis unit 110 generates a synthesized image by synthesizing a background image and an object image (S21). As described above, the object image includes at least a portion close in at least one of hue, saturation and brightness to at least a portion of the background image.

The generation unit 120 then generates a difference image by calculating the difference between the background image and the synthesized image (step S22). The machine learning unit 130 then performs machine learning, using this difference image as learning data (step S23). This enables the image-processing device 100 to output a classifier (dictionary for classification).

An object such as a human in a real environment may have a portion in the same color as is present in a real environment, for example, a person may wear clothes in the same color as is present in a real environment. In such a case, in an image containing a captured object, the part depicting the object may have a portion close in hue, saturation and/or brightness to at least a portion of a captured image of a real environment (background image).

The image-processing device 100 according to the present example embodiment generates a synthesized image by synthesizing an object image and a background image, the object image depicting a portion of an object and having at least a portion close in at least one of hue, saturation and brightness to at least a portion of the background image. The image-processing device 100 then generates a difference image between the synthesized image and the background image. The difference for the portion of the object image close in at least one of hue, saturation and brightness to at least a portion of the background image turns out to be smaller than the differences for the other portions. The image-processing device 100 accordingly generates a difference image that looks as if the object did not exist in the portion for which the difference is small in the segment corresponding to the object image in the difference image. The image-processing device 100 outputs a classifier by performing machine learning, using such a difference image as learning data.

As described above, the classifier also uses as learning data the difference image generated from the object image of an object having a portion close in hue, saturation and/or brightness to the background. Therefore, by calculating the difference between the background image and the captured image of the object having a portion close in at least one of hue, saturation and brightness to the background image, the classifier manages to handle a missing portion in the image of the object when classifying the object. This enables the classifier outputted by the image-processing device 100 to classify an object contained in an image even when the image contains an object having a portion close in hue, saturation and/or brightness to the background. Therefore, the image-processing device 100 can generate a classifier having a higher classification ability.

2. Second Example Embodiment

Next, a second example embodiment will be described based on the above-described first example embodiment. Note that, in the present example embodiment and other example embodiments to be described in the following, the target object to be classified (target object) will be assumed to be a human figure for the sake of simpler description but the target object in each example embodiment is not limited to a human figure. The target object to be classified in each example embodiment may be taken to be any object. In other words, when an object other than a human figure is to be classified, the processing can be performed by replacing the word "human figure" or words corresponding thereto in the following description with the target object.

2. 1 Outline

The image-processing device according to the second example embodiment synthesizes an image for the background (a background image, hereinafter) and a human figure image (an object image), and generates a difference image by calculating the difference between the synthesized image and the background image. Portions of difference images where a human body is present generally have greater luminance values than the background but, in a difference image generated by the method according to the present disclosure, the luminance value of the portion where a human body is present is smaller in the parts having a color similar to the background image. In other words, an image which looks as if there were no human body in that part can be generated. Since a real image can have a part having a color similar to that of the background image, the image-processing device according to the present example embodiment can generate a classifier (dictionary for classification) with a greater classification ability by reproducing such a state and performing machine learning using the generated difference image as learning data.

2. 2 Configuration of Image-Processing Device

Figure 3:
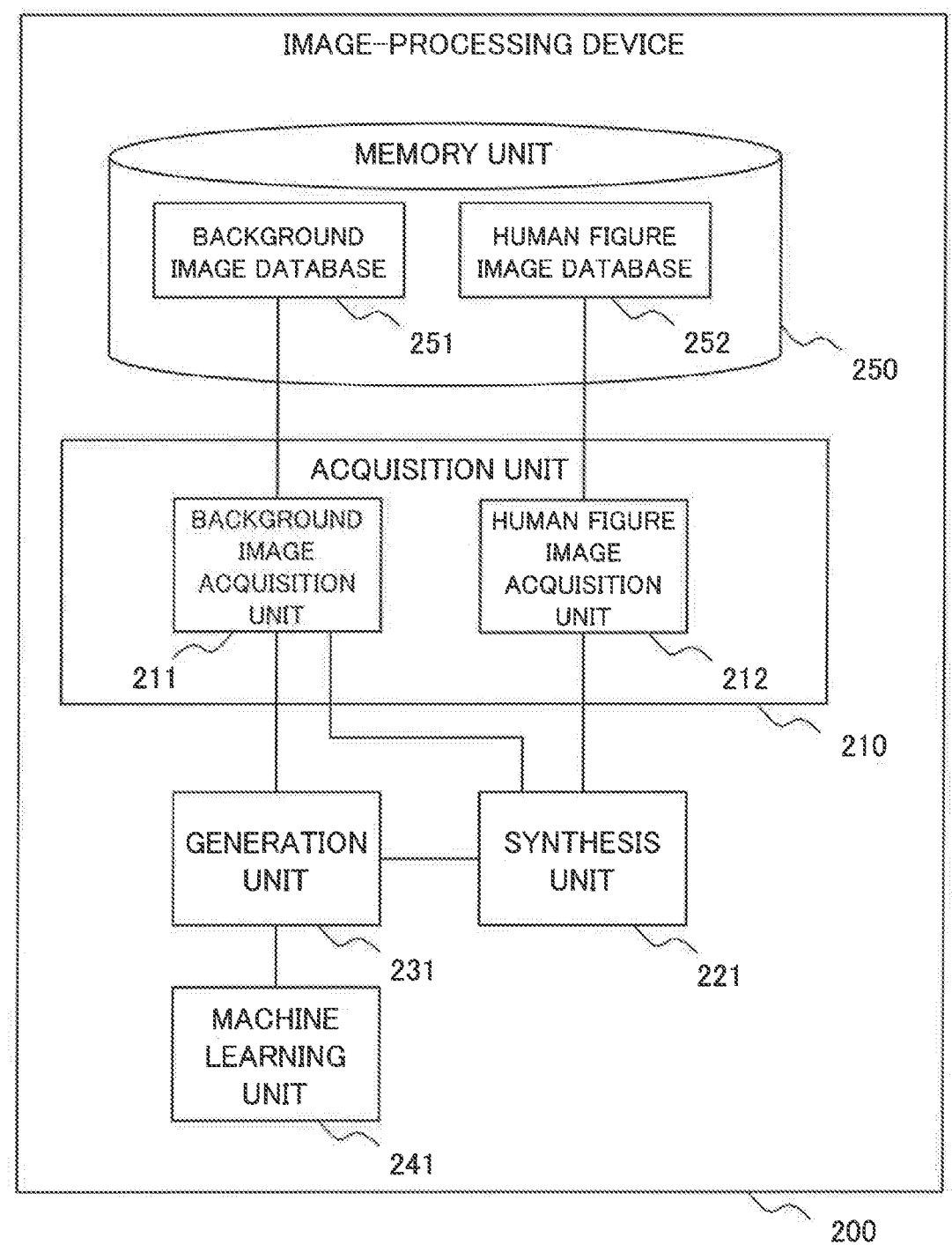
FIG. 3 is a functional block diagram illustrating an example of a functional configuration of an image-processing device according to a second example embodiment.

With reference to FIG. 3, a functional configuration of an image-processing device 200 according to the present example embodiment will be described. FIG. 3 is a functional block diagram illustrating an example of a functional configuration of the image-processing device 200 according to the present example embodiment. As illustrated in FIG. 3, the image-processing device 200 according to the present example embodiment includes an acquisition unit 210, a synthesis unit 221, a generation unit 231, a machine learning unit 241, and a memory unit 250. The synthesis unit 221 corresponds to the above-described synthesis unit 110. The generation unit 231 corresponds to the above-described generation unit 120. The machine learning unit 241 corresponds to the above-described machine learning unit 130.

The memory unit 250 stores, in a database, background images to be used as backgrounds of learning data. Note that the background images may be stored in other forms than a database. A database including one or more of background images will be referred to as a background image database (a background image DB, hereinafter) 251. The background images may include any image, and images from publicly available image database servers may be used but it is preferable to use images containing no human figure.

The memory unit 250 also stores, in a database, images of human figures (human figure images) cut out from images in which human figures are captured. Note that the human figure images may be stored in other forms than a database. A database including one or more of these human figure images will be referred to as a human figure image database (a human figure image DB, hereinafter) 252. The human figure images may include any image but it is preferable that the human figure images each include at least a portion close in at least one of hue, saturation and brightness to at least a portion of at least one background image of the one or more background images. This is for reproducing, in a difference image to be generated by the generation unit 231 to be described later, a lack of difference due to no detection (i.e. missed detection) which can happen in a real image.

Note that the memory unit 250 may be realized by a memory device separate from the image-processing device 200. The background image DB 251 and the human figure image DB 252 may be realized by different memory units.

The acquisition unit 210 includes a background image acquisition unit 211 and a human figure image acquisition unit 212. The background image acquisition unit 211 and the human figure image acquisition unit 212 may be a unit functioning as one acquisition unit.

The background image acquisition unit 211 acquires a background image from the background image DB 251. The background image acquisition unit 211 supplies the background image acquired from the background image DB 251 to the synthesis unit 221. The background image acquisition unit 211 may supply the background image to the generation unit 231. The background image acquisition unit 211 may supply the acquired background image as is. Alternatively, the background image acquisition unit 211 may cut out a portion from the acquired background image and treat the portion as a background image. Further, the background image acquisition unit 211 may produce an image by changing color or the like of the acquired background image and treat the produced image as a background image.

The human figure image acquisition unit 212 acquires a human figure image from the human figure image DB 252. The human figure image acquisition unit 212 supplies the human figure image acquired from the human figure image DB 252 to the synthesis unit 221. The human figure image acquisition unit 212 may supply the acquired human figure image as is to the background image acquisition unit 211 and may produce an image by magnifying or reducing the acquired human figure image and treat the produced image as a human figure image.

Note that it is preferable that the human figure image to be acquired by the background image acquisition unit 212 has at least a portion close in at least one of hue, saturation and brightness to at least a portion of the background image acquired by the background image acquisition unit 211. This is for reproducing, in a difference image to be generated by the generation unit 231 to be described later, a missed detection which can happen in a real image.

Accordingly, the human figure image acquisition unit 212 according to the present example embodiment may acquire a human figure image from the human figure image DB 252, based on the background image acquired by the background image acquisition unit 211. Alternatively, the human figure image acquisition unit 212 may first acquire a human figure image and, based on the human figure image, the background image acquisition unit 211 may acquire from the background image DB 251 a background image having at least a portion close in at least one of hue, saturation and brightness to at least a portion of the human figure image. Note that, for the generation of difference images by the generation unit 231 to be described later, when a difference image with a missed detection that may happen in a real image reproduced therein and a difference image without such a missed detection reproduced therein are both used as learning data, the human figure image acquisition unit 212 or the background image acquisition unit 211 may respectively acquire any human figure image or any background image.

The synthesis unit 221 synthesizes the background image supplied by the background image acquisition unit 211 and the human figure image supplied by the human figure image input unit 212 and generates a synthesized image. The synthesis unit 221 then supplies the generated synthesized image to the generation unit 231. At this time, the synthesis unit 221 may supply information indicating the background image, based on which the synthesized image has been generated, along with the synthesized image. Alternatively, the background image acquisition unit 211 may supply the background image on which the synthesized image has been generated, along with the synthesized image.

The generation unit 231 receives the synthesized image generated by the synthesis unit 221. When the information received with the synthesized image is information indicating a background image, the generation unit 231 identifies the background image indicated by the information from among the background images received from the background image acquisition unit 211. This identified background image will be the background image used for generating a difference image. When the information received with the synthesized image is a background image, the generation unit 231 may use this received background image for generating a difference image.

The generation unit 231 generates a difference image by calculating the difference between the synthesized image and the background image. The difference may be calculated by a generally used method or by other methods. Note that it is preferable that the generation unit 231 uses the same method of calculating a difference as the method for calculating a difference that is used when detecting a human figure using the dictionary for classification outputted by the machine learning unit 241 to be described later. The generation unit 231 supplies the generated difference image to the machine learning unit 241.

The machine learning unit 241 performs machine learning using the difference image generated by the generation unit 231 as learning data. The machine learning unit 241 checks whether or not the amount of the learning data (the number of difference images) is sufficient for performing machine learning (e.g., whether or not the amount is equal to or more than a predetermined threshold value) and performs machine learning when the amount of the learning data is sufficient. As a result of the machine learning, the machine learning unit 241 outputs a classifier (dictionary for classification) for classifying an object in a captured image. The machine learning may be performed by any method and, for example, a learning method by means of a neural network may be used. Further, the machine learning unit 241 may perform machine learning by incorporating the human figure image and/or the synthesized image in the learning data.

2. 3 Sequence of Processing

Figure 4:
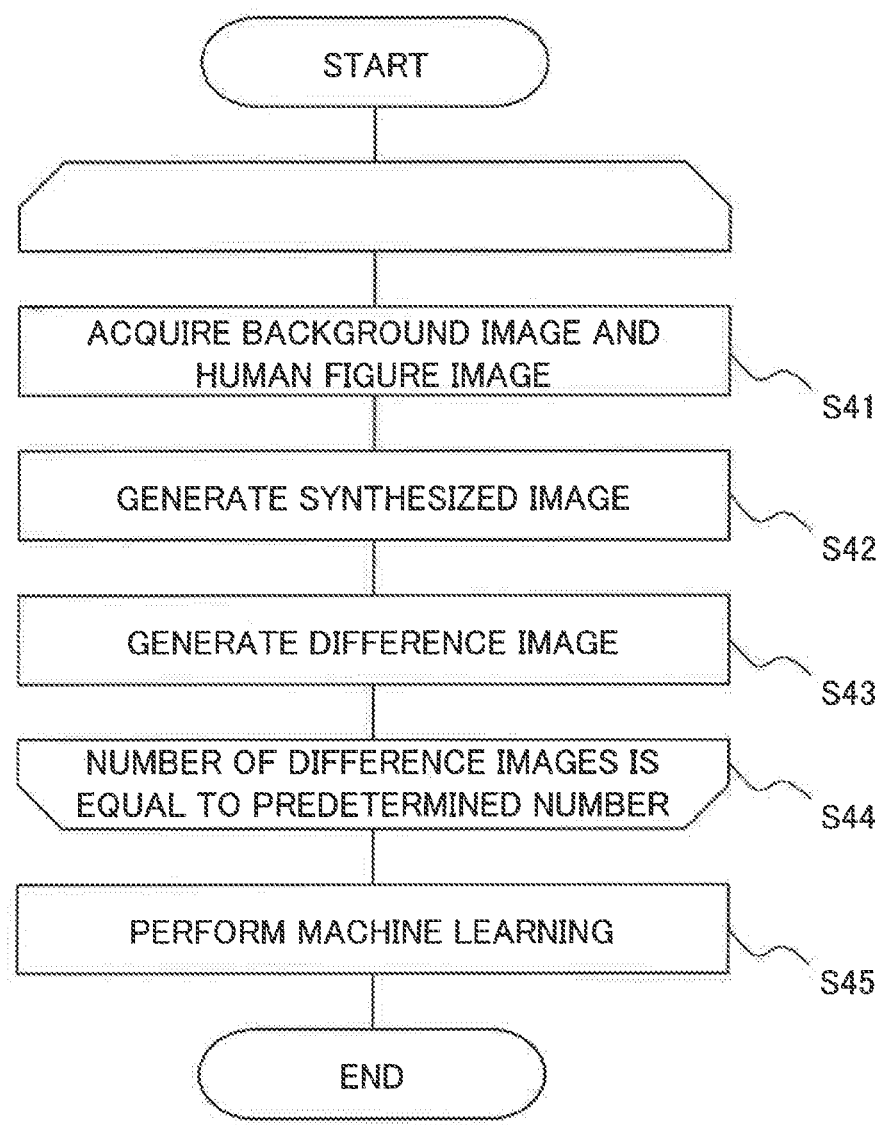
FIG. 4 is a flow chart illustrating an example of a sequence of processing by the image-processing device according to the second example embodiment.
Figure 5:
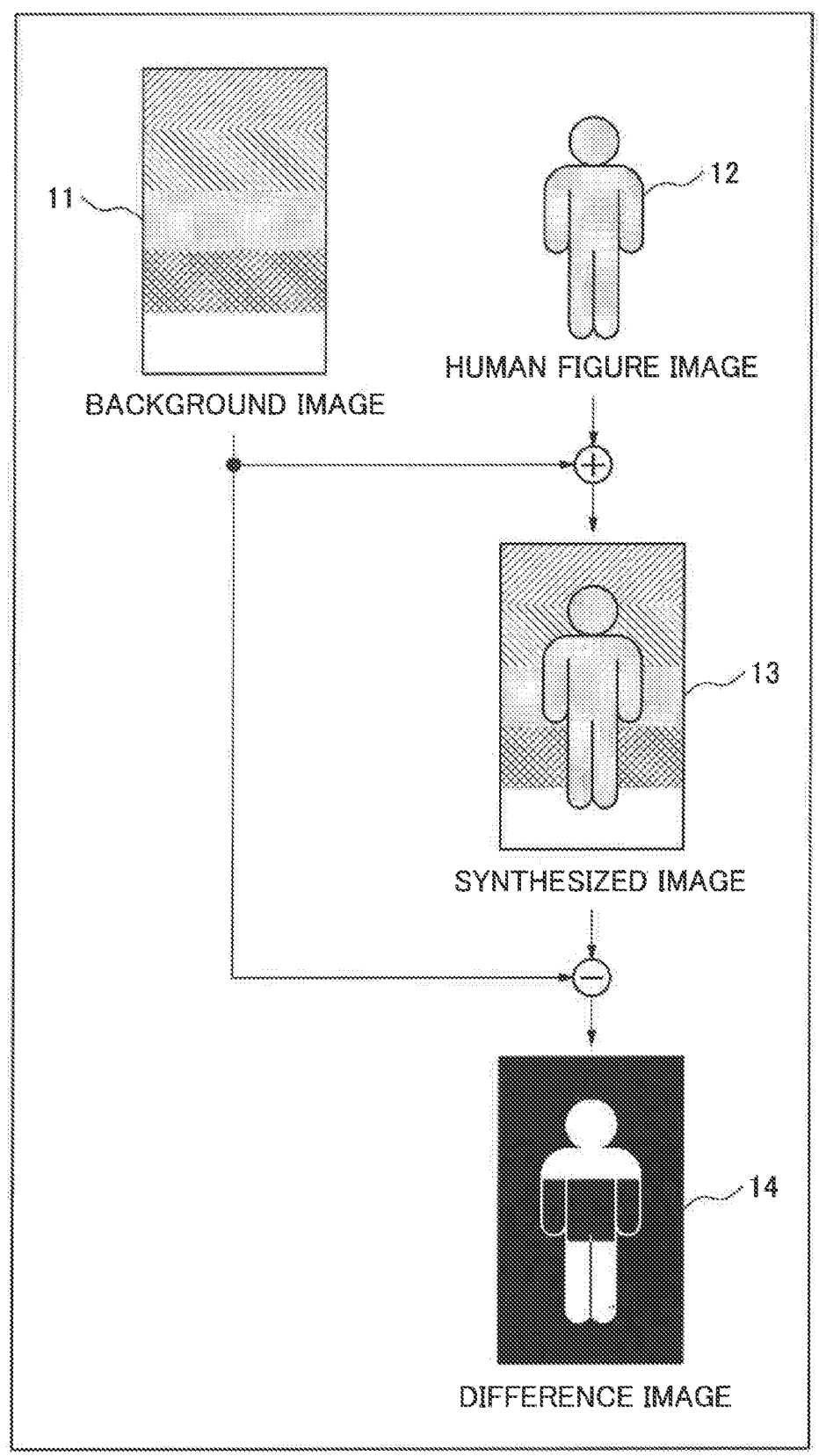
FIG. 5 is a diagram schematically illustrating an example of the progress at each stage of the processing according to the second example embodiment.

A sequence of processing by the image-processing device 200 will be described below with reference to FIGS. 4 and 5. FIG. 4 is a flow chart illustrating an example of a sequence of processing by the image-processing device 200. FIG. 5 is a diagram schematically illustrating an example of the progress at each stage of the processing.

The background image acquisition unit 211 and the human figure image acquisition unit 212 respectively acquire a new background image and a human figure image from the background image DB 251 and the human figure image DB 252 (step S41, to be referred to simply as S41 hereinafter). The background image acquisition unit 211 may acquire the background image at the same time as the human figure image acquisition unit 212 acquires the background image. For example, when the human figure image acquisition unit 212 acquires the human figure image, based on the background image as described above, the human figure image acquisition unit 212 acquires the human figure image at a later timing than the background image acquisition unit 211 acquires the background image. In the present example embodiment, the human figure image acquired by the human figure image acquisition unit 212 has at least a portion close in at least one of hue, saturation and brightness to at least a portion of the background image. Assume that the background image 11 and the human figure image 12 acquired by the processing in step S41 are as illustrated in FIG. 5.

Next, the synthesis unit 221 synthesizes the background image 11 acquired by the background image acquisition unit 211 and the human figure image 12 acquired by the human figure image acquisition unit 212 and generates a synthesized image 13 (S42). As illustrated in FIG. 5, the synthesized image 13 is an image synthesized from the background image 11 and the human figure image 12.

The generation unit 231 generates a difference image 14 by calculating the difference between the synthesized image 13 generated by the synthesis unit 221 and the background image 11 acquired by the background image acquisition unit 211 (S43). As illustrated in FIG. 5, in the difference image 14, the portion of the human figure segment that is close in hue, saturation and/or brightness to a portion of the background image 11 and the background portion are in black. The black portions are the parts where the value of the difference is smaller than a predetermined threshold value and where the generation unit 231 has determined that there is no difference. Thus the generation unit 231 generates a difference image 14 with a missed detection that may happen in a real image reproduced therein.

The image-processing device 200 then checks whether or not the number of the difference images 14 is equal to a predetermined number and, when the number of the difference images 14 is below the predetermined number, repeats steps S41 to 43 (loop S44) until the number of the difference images 14 reaches the predetermined number. In making this determination, the image-processing device 200 may count only the number of the difference images 14 consisting of the difference images 14 generated from a background image 11 and a human figure image 12 wherein at least a portion of the background image 11 is close in hue, saturation and/or brightness to at least a portion of the human figure image 12. Alternatively, the image-processing device 200 may count the number of the difference images 14 including difference images 14 generated from a human figure image 12 and a background image 11 that share no similar portion.

As described above, the image-processing device 200 generates a plurality of learning data required for machine learning by repeating the processing in steps S41, S42, and S43.

The machine learning unit 241 executes machine learning (S45) using a set of learning data (a plurality of difference images 14) obtained by repeating steps S41, S42, and S43. Thus the image-processing device 200 can output a dictionary for classification.

2. 4 Advantageous Effects According to the Present Example Embodiment

As described above, the image-processing device 200 according to the present example embodiment generates a difference image with a missed detection that may happen in a real image reproduced therein, by synthesizing a background image and a human figure image and by calculating a difference between the synthesized image and the background image. Since this allows the image-processing device 200 to generate a large number of difference images with a missed detection reproduced therein, machine learning can be performed using these difference images as learning data. Since these learning data are data closer to a real environment, with a missed detection reproduced therein, the classifier (dictionary for classification) generated by the machine learning performed using these learning data has a high classification ability. Therefore, the image-processing device 200 according to the present example embodiment can generate a classifier (dictionary for classification) having a high classification ability.

3. Third Example Embodiment

In the present example embodiment, a shadow will be referred to as noise. Although it is not common to refer to a shadow as noise, any element except the target object that may appear on a difference image will be referred to as noise in the following description.

3. 1 Outline

An image-processing device according to a third example embodiment generates a difference image by adding noise that may occur in a real environment such as a shadow to a synthesized image generated by the image-processing device 200 according to the second example embodiment and by calculating the difference between the image to which the noise has been added and the background image. In the case of a real image, noise may be erroneously detected as a foreground, as typified by an erroneous detection of a shadow. However, the image-processing device according to the present example embodiment can generate a classifier (dictionary for classification) with a higher classification ability by generating difference images with noise reproduced therein and by performing machine learning using the generated difference images as learning data.

In the present example embodiment, the members having the same functions as the members described in the second example embodiment are denoted by the same reference signs and will not be described in further detail.

3. 2 Configuration of Image-Processing Device

Figure 6:
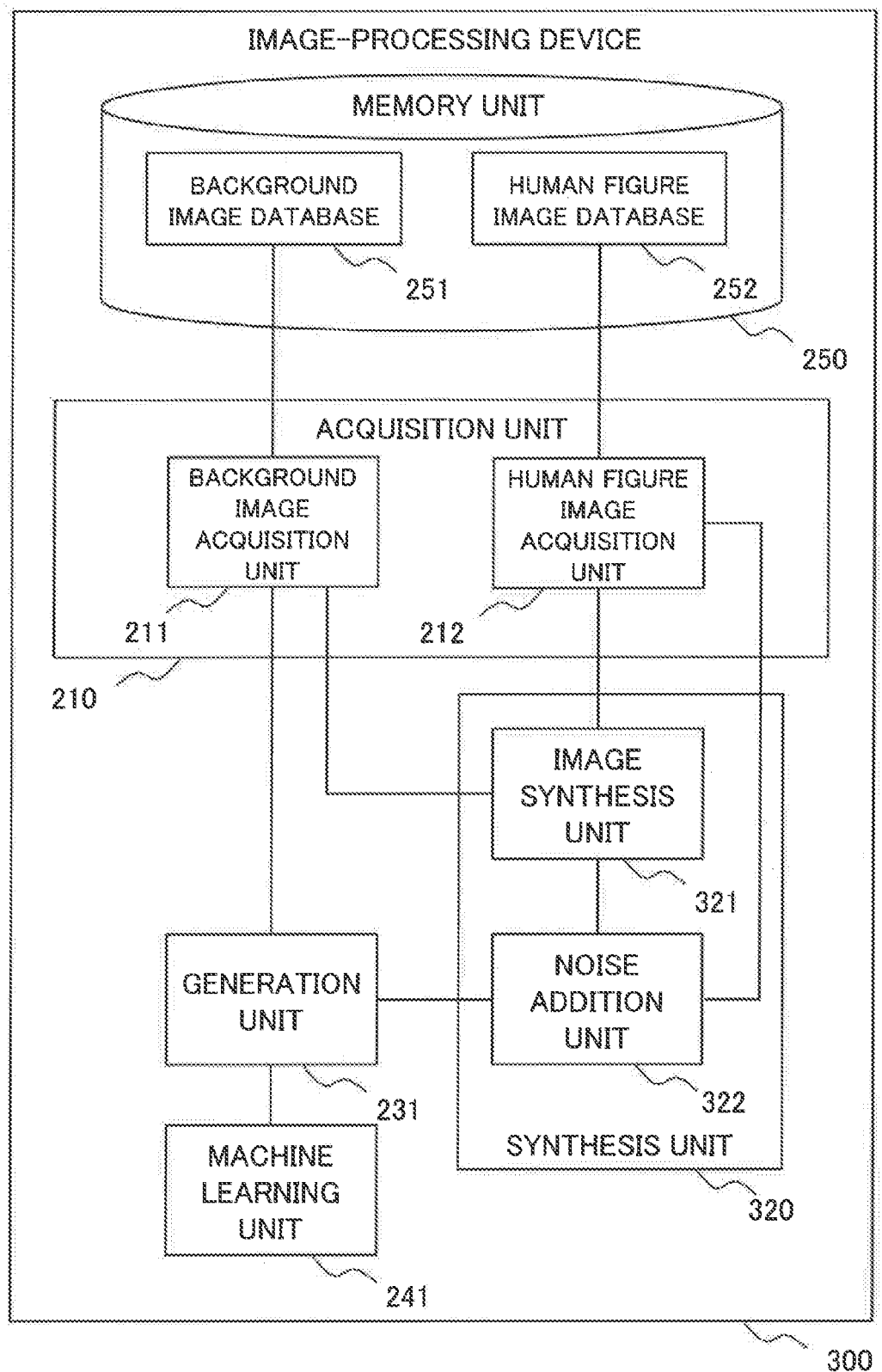
FIG. 6 is a functional block diagram illustrating an example of a functional configuration of an image-processing device according to a third example embodiment.
Figure 7:
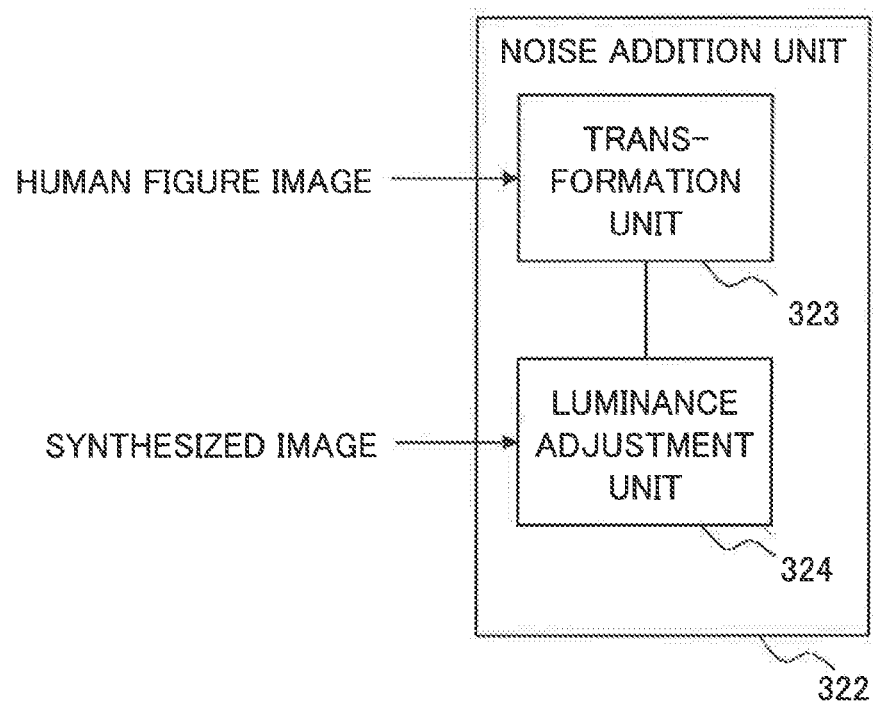
FIG. 7 is a functional block diagram illustrating an example of a functional configuration of the noise addition unit of FIG. 6.

With reference to FIGS. 6 and 7, a functional configuration of an image-processing device 300 according to the present example embodiment will be described. FIG. 6 is a functional block diagram illustrating an example of a functional configuration of the image-processing device 300 according to the present example embodiment. FIG. 7 is a functional block diagram illustrating an example of a functional configuration of the noise addition unit of FIG. 6 in further detail. The image-processing device 300 according to the third example embodiment will be described below with reference to these drawings.

As illustrated in FIG. 6, the image-processing device 300 includes an acquisition unit 210, a synthesis unit 320, a generation unit 231, a machine learning unit 241, and a memory unit 250. The image-processing device 300 according to the present example embodiment is configured to include the synthesis unit 320 to replace the synthesis unit 221 of the image-processing device 200 according to the above-described second example embodiment.

The synthesis unit 320 includes an image synthesis unit 321 and a noise addition unit 322. The image synthesis unit 321 has a similar function as the synthesis unit 221 in the above-described second example embodiment and will not be further described.

The noise addition unit 322 adds noise such as a shadow to a synthesized image. Hereinafter, a synthesized image to which noise has been added will be referred to as a noise-added image. The noise addition unit 322 outputs a noise-added image to the generation unit 231.

When adding a shadow as noise, the noise addition unit 322 presumptively adds a shadow segment by using the human figure image. In other words, in the present example embodiment, a shadow added as noise can be paraphrased as a pseudo-shadow. The functional configuration of the noise addition unit 322 for adding such a pseudo-shadow will be described further with reference to FIG. 7.

As illustrated in FIG. 7, the noise addition unit 322 includes a transformation unit 323 and a luminance adjustment unit 324.

The transformation unit 323 transforms a human figure image acquired by the human figure image acquisition unit 212 and generates a transformed human figure image. Methods of transformation to be employed by the transformation unit 323 include, for example, a method in which the feet portion contained in a human figure image is inferred from the human figure image and a projective transformation is applied to the human figure image while fixing the inferred feet portion (footing) at its original position. The transformation unit 323 thus generates a transformed image by applying a projective transformation to a human figure image. The transformation unit 323 then supplies the transformed image to the luminance adjustment unit 324.

To the luminance adjustment unit 324 are inputted synthesized images and transformed images. The luminance adjustment unit 324 uses a synthesized image and a transformed image and generates a noise-added image by adjusting (altering) the luminance of the segment presumed to be a shadow segment in the synthesized image. For example, the luminance adjustment unit 324 infers from the human figure segment contained in a synthesized image the feet portion of the human figure and, based on the footing of the human figure, presumes the part of the synthesized image that can correspond to the transformed image to be a shadow segment. The luminance adjustment unit 324 then alters the luminance of the segment of the synthesized image that has been presumed to be a shadow segment (the segment corresponding to the transformed image), in relation to the synthesized image. For example, the luminance adjustment unit 324 decreases the luminance of the segment that has been presumed to be a shadow segment, in relation to the synthesized image. The luminance adjustment unit 324 then supplies the synthesized image in which the luminance of the segment presumed to be a shadow segment has been altered to the generation unit 231 as noise-added image.

Note that the noise addition unit 322 may generate a pseudo-shadow without using a human figure image and may generate a pseudo-shadow by acquiring from the human figure image DB 252 a human figure image different from the human figure image used for the synthesized image. Further, the noise addition unit 322 may add any noise such as impulse noise or Gaussian noise, instead of the above-described pseudo-shadow. Further, the noise addition unit 322 may combine a plurality of kinds of noises. It suffices that the noise addition unit 322 adds noise that can happen in a real image.

The generation unit 231 generates a difference image from the background image and the synthesized image, similarly to the generation unit 231 in the above-described second example embodiment. In the present example embodiment, the synthesized image is a synthesized image to which noise has been added (i.e., a noise-added image). Therefore, the generation unit 231 generates a difference image by calculating the difference between the noise-added image generated by the noise addition unit 322 of the synthesis unit 320 and the background image acquired by the background image acquisition unit 211. The generation unit 231 may further add any noise to the generated difference image.

In calculating the difference, the generation unit 231 employs a similar method to the method used in the second example embodiment but it is preferable that the method used for calculating the difference does not include a process of removing the kind of noise that has been added. This is because the noise imitatively added by the noise addition unit 322 can exactly be a kind of noise that a nose-removing algorithm predicts and be removed.

3. 3 Sequence of Processing

Figure 8:
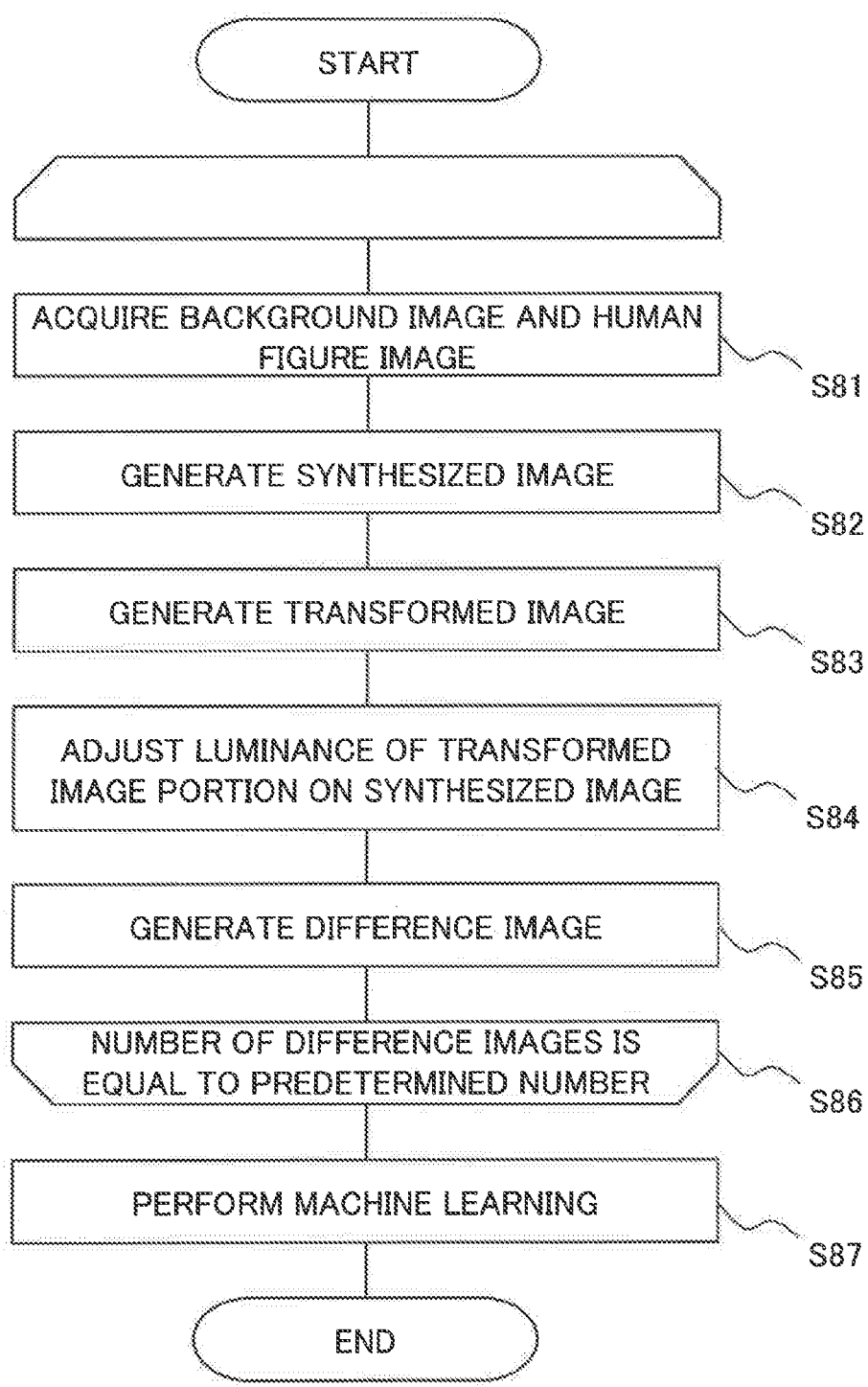
FIG. 8 is a flow chart illustrating an example of a sequence of processing by the image-processing device according to the third example embodiment.
Figure 9:
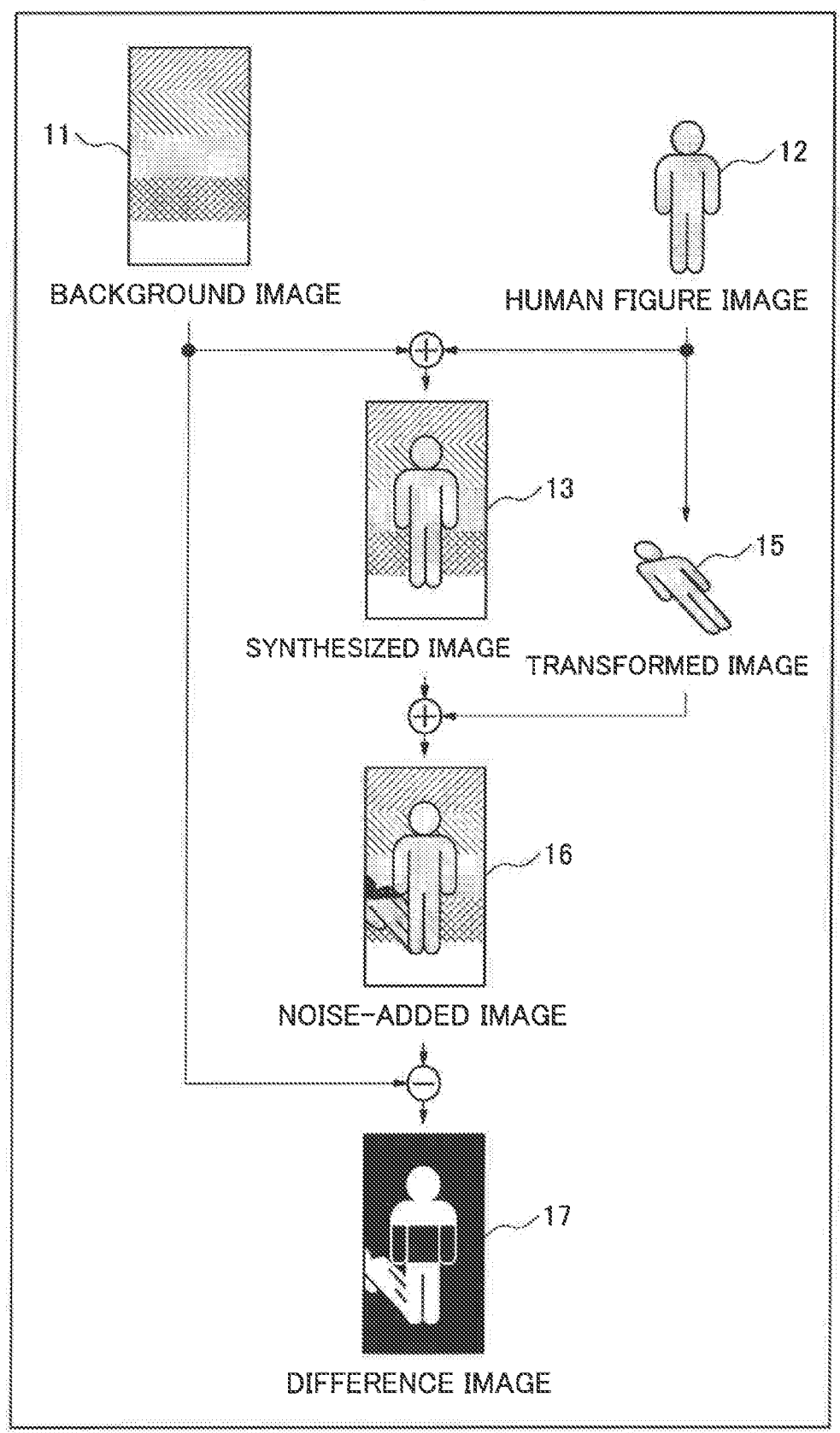
FIG. 9 is a diagram schematically illustrating an example of the progress at each stage of the processing according to the third example embodiment.

A sequence of processing by the image-processing device 300 will be described below with reference to FIGS. 8 and 9. FIG. 8 is a flow chart illustrating an example of a sequence of processing by the image-processing device 300. FIG. 9 is a diagram schematically illustrating an example of the progress at each stage of the processing. In the following, description will be made as to a case in which the noise is a pseudo-shadow.

Steps S81 and S82 are similar to steps S41 and S42 in the second example embodiment.

The transformation unit 323 of the noise addition unit 322 transforms a human figure image 12 and generates a transformed image 15 (S83). By using the human figure image transformed by the transformation unit 323 (the transformed image 15) and the synthesized image 13, the luminance adjustment unit 324 adjusts (alters) the luminance of the portion of the synthesized image 13 that corresponds to the transformed image 15 (the portion of the pseudo-shadow) (S84). By the processing in steps S83 and S84, the noise addition unit 322 generates a noise-added image 16, which is an image created by adding noise to the synthesized image 13 generated by the image synthesis unit 321.

The generation unit 231 generates a difference image 17 by calculating the difference between the noise-added image (a synthesized image to which noise has been added) 16 generated by the noise addition unit 322 and a background image 11 acquired by the background image acquisition unit 211 (S85).

As illustrated in FIG. 9, in the difference image 17, the portion of the human figure segment that is close in hue, saturation and/or brightness to a portion of the background image 11 and the portion of the background except for the shadow are in black. The black portions are where the value of the difference is smaller than a predetermined threshold value and where the generation unit 231 has determined that there is no difference. Thus the generation unit 231 generates a difference image 17 with a missed detection that may happen in a real image reproduced therein.

The image-processing device 300 then checks whether or not the number of the difference images 17 is equal to a predetermined number and, when the number of the difference images 17 is below the predetermined number, repeats steps S81 to 85 (loop S86) until the number of the difference images 17 reaches the predetermined number. In making this determination, the image-processing device 300 may count only the number of the difference images 17 consisting of the difference images 14 generated from a background image 11 and a human figure image 12 wherein at least a portion of the background image 11 is close in hue, saturation and/or brightness to at least a portion of the human figure image 12. Alternatively, the image-processing device 300 may count the number of the difference images 14 including difference images 17 generated by a human figure image 12 and a background image 11 that share no similar portion.

As described above, the image-processing device 300 generates a plurality of learning data required for machine learning by repeating the processing in steps S81 to S85.

The machine learning unit 241 executes machine learning (S87) using a set of learning data (a plurality of difference images 17) obtained by repeating steps S81 to S85. Thus the image-processing device 300 can output a dictionary for classification.

3. 4 Advantageous Effects According to the Present Example Embodiment

The image-processing device 300 according to the present example embodiment can generate an image containing a false detection of a difference that may happen in a real environment reproduced on a synthesized image generated by the generation unit 120 of the image-processing device 200 according to the first example embodiment. This is because the noise addition unit 322 adds noise to the synthesized image. A false detection of a difference is caused not only by factors recognizable at sight such as a shadow but also by factors difficult to recognize at sight, such as a slight change in lighting conditions. However, such a condition can be reproduced by the noise addition unit 322 adding noise to the synthesized image. Thus the image-processing device 300 can generate a difference image with a missed detection reproduced therein. Therefore, the image-processing device 300, performing machine learning using such difference images as learning data, can produce a more robust classifier (dictionary for classification) in addition to the advantageous effects of the image-processing devices according to the above-described first and second example embodiment.

4. Fourth Example Embodiment

4. 1 Outline

An image-processing device according to a fourth example embodiment applies image processing such as blur processing to images acquired or generated in the first to the third example embodiments. The image-processing device according to the present example embodiment can mitigate the unnaturalness inherent in synthesized images and produce more natural images by applying such image processing to the acquired or generated images. The image-processing device can generate a classifier (dictionary for classification) having a higher classification ability by performing learning using the natural images.

In the present example embodiment, the members having the same functions as the members described in the second example embodiment are denoted by the same reference signs and will not be described in further detail.

4. 2 Configuration of Image-Processing Device

Figure 10:
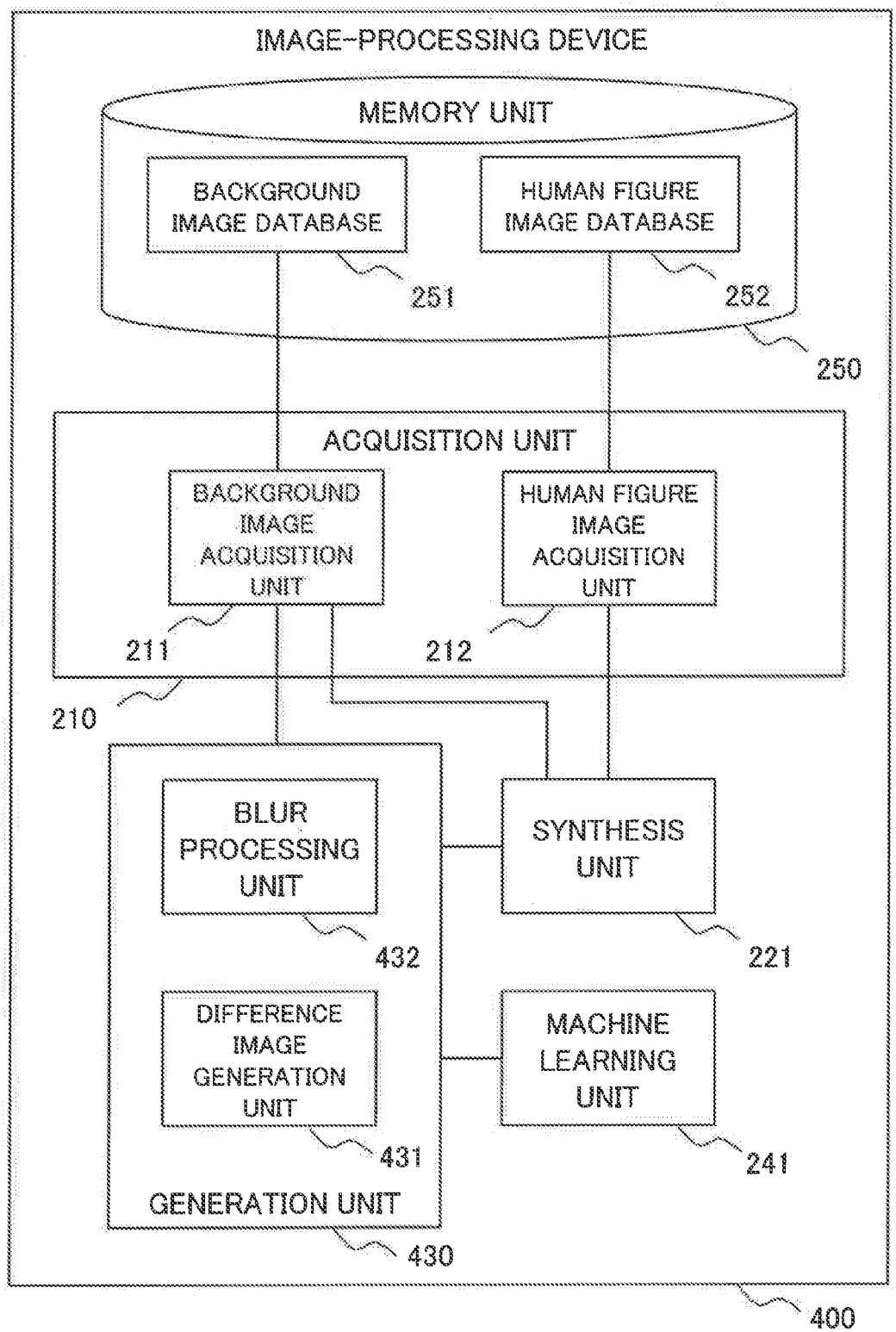
FIG. 10 is a functional block diagram illustrating an example of a functional configuration of an image-processing device according to a fourth example embodiment.

With reference to FIG. 10, a functional configuration of an image-processing device 400 according to the present example embodiment will be described. FIG. 10 is a functional block diagram illustrating an example of a functional configuration of an image-processing device 400 according to the present example embodiment.

As illustrated in FIG. 10, the image-processing device 400 includes an acquisition unit 210, a synthesis unit 221, a machine learning unit 241, a memory unit 250, and a generation unit 430. In other words, the image-processing device 400 according to the present example embodiment is configured to include the generation unit 430 to replace the generation unit 231 of the image-processing device 200 according to the above-described second example embodiment. The image-processing device 400 according to the present example embodiment may be configured to include a generation unit 430 to replace the generation unit 231 of the image-processing device 300 according to the above-described third example embodiment.

As illustrated in FIG. 10, the generation unit 430 includes a difference image generation unit 431 and a blur processing unit 432. The difference image generation unit 431 has a similar function to the generation unit 231 in the above-described second or third example embodiment and will not be further described.

The blur processing unit 432 applies image processing such as blur processing to both of the synthesized image and the background image. The blur processing unit 432 may apply image processing such as blur processing to a difference image generated by the difference image generation unit 431. Further, when the image-processing device 400 is configured to include the generation unit 430 to replace the generation unit 231 of the image-processing device 300, the blur processing unit 432 can apply blur processing to both of the synthesized image to which noise has been added (the noise-added image) and the background image. Further, also when the image-processing device 400 is configured to include a generation unit 430 to replace the generation unit 231 of the image-processing device 300, the blur processing unit 432 may apply blur processing to the difference image generated by the difference image generation unit 431.

The image processing may be performed by any technique and, for example, smoothing by a Gaussian filter may be employed for image processing.

4. 3 Sequence of Processing

A sequence of processing by the image-processing device 400 will be described below with reference to FIG. 11. FIG. 11 is a flow chart illustrating an example of a sequence of processing by the image-processing device 400. FIG. 11 illustrates an example of processing in which blur processing is applied to a synthesized image as well as to a background image.

Steps S111 and S112 are similar to steps S41 and S42 in the second example embodiment.

The blur processing unit 432 executes blur processing on both of the background image acquired in step S111 and the synthesized image generated in step S112 (S113). The synthesized image on which the blur processing is executed may be, for example, a synthesized image 13 illustrated in FIG. 5 and may be a synthesized image to which noise has been added such as a noise-added image 16 illustrated in FIG. 9. The blur processing unit 432 then supplies the blurred background image and the blurred synthesized image to the difference image generation unit 431. After that, the difference image generation unit 431 generates a difference image by calculating the difference between the background image and the synthesized image both blurred by the blur processing unit 432 (S114). The image-processing device 400 then checks whether or not the number of the difference images is equal to a predetermined number and, when the number is below the predetermined number, repeats steps S111 to 114 (loop S115) until the number reaches the predetermined number.

The machine learning unit 241 executes machine learning (S116) using a set of learning data (a plurality of difference images) obtained by repeating steps S111 to 114. Thus the image-processing device 400 can output a dictionary for classification.

As described above, blur processing may be applied to a difference image. Another example of a sequence of processing by the image-processing device 400 will be described below with reference to FIG. 12. FIG. 12 is a flow chart illustrating another example of a sequence of processing by the image-processing device 400. FIG. 12 illustrates an example of processing in which blur processing is applied to a difference image.

Step S121 to S123 are respectively similar to steps S41 to S43 in the second example embodiment. Steps S81 to S85 may be executed instead of steps S121 to S123.

The blur processing unit 432 executes blur processing (S124) on a difference image generated in step S123. The blur processing unit 432 outputs the blurred difference image to the machine learning unit 241. The machine learning unit 241 performs machine learning using a predetermined number of difference images as learning data, similarly to the above-described loop S115 and step S116 (S125, S126).

4. 4 Advantageous Effects According to the Present Example Embodiment

Synthesized images may have unnatural portions, for example, in terms of luminance in boundary portions in the images. However, by the application of image processing, such as blur processing, by the blur processing unit 432 of the image-processing device 400 according to the present example embodiment, such unnatural portions are smoothed and natural images closer to real images are generated. The image-processing device 400 according to the present example embodiment, performing machine learning using such images, can produce an even more robust dictionary for classification in addition to the advantageous effects of the image-processing devices according to the above-described first to third example embodiment.

5. On Hardware Configuration

In the example embodiments of the present disclosure, the constituent elements of the image-processing devices represent functional blocks. The constituent elements of the image-processing devices are partially or wholly realized by a freely selected combination of, for example, an information processing device 900 as illustrated in FIG. 13 and a program. FIG. 13 is a block diagram illustrative of an example of a hardware configuration of an information processing device 900 that realizes the constituent elements of the devices. The information processing device 900 includes, for example, the components below:

Central processing unit (CPU) 901
Read only memory (ROM) 902
Random access memory (RAM) 903
Program 904 loaded into the RAM 903
Storage 905 to store the program 904
Drive 907 to read and write the recording medium 906
Communication interface 908 to connect with a communication network 909
Input/output interface 910 for data input/output
Bus 911 connecting the constituent elements.

The constituent elements of the image-processing devices in the example embodiments are realized by the CPU 901 acquiring and executing the program 904 for realizing the functions of the constituent elements. The program 904 for realizing the functions of the constituent elements of the image-processing devices is, for example, stored in advance in the storage 905 or the RAM 903 and read by the CPU 901 as necessary. The program 904 may be supplied to the CPU 901 via a communication network 909 or may be stored in advance in the recording medium 906, from which the drive 907 reads the program and supplies it to the CPU 901.

There are various modified examples of the way the image-processing devices are realized. For example, each image-processing device may be realized by respectively allocating freely selected combinations of separate information processing devices 900 and programs to the constituent elements. Alternatively, each image-processing device may have a plurality of constituent elements realized by a freely selected combination of one information processing device 900 and a program.

Further, the constituent elements of the image-processing devices are realized wholly or partially by other general-purpose or dedicated circuits, processors, or the like, or combinations thereof. They may be constituted by a single chip or may be constituted by a plurality of chips interconnected by a bus.

The constituent elements of the image-processing devices may be realized wholly or partially by combinations of the above-described circuits or the like and programs.

When the constituent elements of the image-processing devices are realized wholly or partially by a plurality of information processing devices, circuits, or the like, the plurality of information processing devices, circuits, or the like may be disposed in a centralized arrangement or a distributed arrangement. For example, the information processing devices, circuits, or the like, may be realized in such a manner that a client server system, a cloud computing system, and the like are connected via a communication network.

6. Supplementary Notes

The above-described example embodiments are preferable example embodiments of the present disclosure and it is not intended that the scope of the present disclosure should be restricted to the above-described example embodiments; it is possible to construct an embodiment in which a person skilled in the art can make modifications and substitutions to each of the above-described example embodiments without departing from the scope of the present disclosure.

REFERENCE SIGNS LIST

11 background image
12 human figure image
13 synthesized image
14 difference image
15 transformed image
16 noise-added image
17 difference image
100 image-processing device
110 synthesis unit
120 generation unit
130 machine learning unit
200 image-processing device
210 acquisition unit
211 background image acquisition unit
212 human figure image acquisition unit
221 synthesis unit
231 generation unit
241 machine learning unit
250 memory unit
251 background image database (background image DB)
252 human figure image database (human figure image DB)
320 synthesis unit
321 image synthesis unit
322 noise addition unit
323 transformation unit
324 luminance adjustment unit
400 image-processing device
430 generation unit
431 difference image generation unit
432 blur processing unit

The invention claimed is:

1. An image-processing device comprising:
   at least one memory storing instructions; and
   at least one processor configured to execute the instructions to:
   generate a difference image between a background image and a synthesized image wherein the synthesized image is generated by synthesizing the background image and an object image having at least one portion close in at least one of hue, saturation and brightness to at least one portion of the background image;
   perform machine learning using the difference image as learning data;
   add noise to the synthesized image;
   generate a difference image between the background image and the synthesized image to which the noise has been added; and
   add a pseudo-shadow as noise to the synthesized image by transforming the object image, inferring a shadow part segment of an object in the synthesized image by using the synthesized image and the transformed object image, and altering a luminance of the shadow part segment of the synthesized image in relation to the synthesized image.

2. The image-processing device according to claim 1, wherein the noise is at least one of a pseudo-shadow, impulse noise, and Gaussian noise.

3. The image-processing device according to claim 1, wherein the at least one processor is further configured to apply a blur to the background image and the synthesized image, and
   generate a difference image between the background image and the synthesized image to which the blur has been applied.

4. The image-processing device according to claim 1, wherein the at least one processor is further configured to apply a blur to the generated difference image, and
   perform machine learning using the difference image to which the blur has been applied as learning data.

5. The image-processing device according to claim 1, wherein the object image is a human figure image.

6. The image-processing device according to claim 1, wherein a neural network is used for the machine learning.

7. An image-processing method comprising:
   generating a difference image between a background image and a synthesized image wherein the synthesized image is generated by synthesizing the background image and an object image having at least one portion close in at least one of hue, saturation and brightness to at least one portion of the background image;
   performing machine learning using the difference image as learning data;

adding noise to the synthesized image;

generating a difference image between the background image and the synthesized image to which the noise has been added; and adding a pseudo-shadow as noise to the synthesized image by transforming the object image, inferring a shadow part segment of an object in the synthesized image by using the synthesized image and the transformed object image, and altering a luminance of the shadow part segment of the synthesized image in relation to the synthesized image.

8. A non-transitory computer-readable recording medium storing a program configured to cause a computer to execute:

a process of generating a difference image between a background image and a synthesized image wherein the synthesized image is generated by synthesizing the background image and an object image having at least one portion close in at least one of hue, saturation and brightness to at least one portion of the background image;

a process of performing machine learning using the difference image as learning data;

a process of adding noise to the synthesized image;

a process of generating a difference image between the background image and the synthesized image to which the noise has been added; and a process of adding a pseudo-shadow as noise to the synthesized image by transforming the object image, inferring a shadow part segment of an object in the synthesized image by using the synthesized image and the transformed object image, and altering a luminance of the shadow part segment of the synthesized image in relation to the synthesized image.

* * * * *